United States Patent
Östberg et al.

(10) Patent No.: US 7,013,140 B2
(45) Date of Patent: Mar. 14, 2006

(54) MOBILE TERMINALS AND METHODS FOR PERFORMING FAST INITIAL FREQUENCY SCANS AND CELL SEARCHES

(75) Inventors: Christer Östberg, Staffanstorp (SE); Hans Stattin, Malmö (SE); Bengt Lindoff, Bjärred (SE)

(73) Assignee: Telefonaktiebolaget L.M. Ericsson, Stockholm (SE)

( * ) Notice: Subject to any disclaimer, the term of this patent is extended or adjusted under 35 U.S.C. 154(b) by 451 days.

(21) Appl. No.: 10/315,710

(22) Filed: Dec. 10, 2002

(65) Prior Publication Data

US 2004/0203839 A1 Oct. 14, 2004

Related U.S. Application Data

(60) Provisional application No. 60/411,991, filed on Sep. 19, 2002.

(51) Int. Cl.
*H04Q 7/20* (2006.01)

(52) U.S. Cl. ............... 455/434; 455/166.1; 455/166.2

(58) Field of Classification Search ............... 455/434, 455/161.1, 161.2, 161.3, 166.1, 166.2, 435.2, 455/435.3, 552.1, 443, 429, 452.2, 453, 525

See application file for complete search history.

(56) References Cited

U.S. PATENT DOCUMENTS

| 4,361,907 | A | * | 11/1982 | Wine ................. 455/160.1 |
| 5,524,280 | A | * | 6/1996 | Douthitt et al. ........... 455/62 |
| 6,205,334 | B1 | | 3/2001 | Dent |

FOREIGN PATENT DOCUMENTS

| EP | 1 058 469 A1 | 6/2000 |
| EP | 1 028 599 A2 | 8/2000 |
| WO | WO 97/36449 A1 | 10/1997 |
| WO | WO 03/092313 A1 | 11/2003 |

OTHER PUBLICATIONS

Wang et al., *Cell Search in W-CDMA*, IEEE Journal on Selected Areas in Communications, vol. 18, No. 8, Aug. 2000, pp. 1470-1482.
International Search Report, PCT/EP03/10252, Mar. 11, 2004.

* cited by examiner

*Primary Examiner*—Jean Gelin
(74) *Attorney, Agent, or Firm*—Myers Bigel Sibley & Sajovec, P.A.

(57) ABSTRACT

A mobile terminal can identify cellular control channels that can be received by the mobile terminal from a cellular system, by identifying a cellular control channel that can be received from a history list of cellular control channels that were previously received by the mobile terminal. A next cellular control channel that can be received by the mobile terminal then is scanned for, by skipping at least one cellular control channel that is adjacent the cellular control channel that was identified, based on channel allocation rules in the cellular system.

29 Claims, 5 Drawing Sheets

```
  ┌─────────────────────────────────┐
  │    IDENTIFY CONTROL CHANNELS    │
  └─────────────────────────────────┘
                  │
                  ▼
  ┌─────────────────────────────────┐
  │   IDENTIFY CONTROL CHANNEL      │──410
  │      FROM HISTORY LIST          │
  └─────────────────────────────────┘
                  │
                  ▼
  ┌─────────────────────────────────┐
  │ SCAN FOR NEXT CONTROL CHANNEL   │
  │  BY SKIPPING ADJACENT CONTROL   │──420
  │   CHANNEL(S) BASED ON CHANNEL   │
  │        ALLOCATION RULES         │
  └─────────────────────────────────┘
                  │
                  ▼
              ( END )
```

MOBILE TERMINALS AND METHODS FOR PERFORMING FAST INITIAL FREQUENCY SCANS AND CELL SEARCHES

CROSS-REFERENCE TO PROVISIONAL APPLICATION

This application claims the benefit of provisional Application No. 60/411,991, filed Sep. 19, 2002, entitled Fast Initial Frequency Scan and Cell Search, the disclosure of which is hereby incorporated herein by reference in its entirety as if set forth fully herein.

FIELD OF THE INVENTION

This invention relates to mobile terminals and operating methods therefor, and more particularly to mobile terminals and operating methods for performing an initial search of cellular control channels.

BACKGROUND OF THE INVENTION

Mobile terminals are widely used for wireless mobile communications of voice and/or data. As used herein, the term "mobile terminal" encompasses a wide variety of portable wireless devices that can access a cellular system. Mobile terminals include a cellular radiotelephone with a multi-line display, a Personal Communications System (PCS) terminal that may combine a cellular radiotelephone with data processing, facsimile and/or data communications capabilities, a Personal Digital Assistant (PDA) that can include a radiotelephone, pager, Internet/intranet access, Web browser, organizer, calendar and/or a Global Positioning System (GPS) receiver, and conventional laptop, palmtop and/or pervasive computing devices that include wireless receivers.

As is well known to those having skill in the art, in a terrestrial or satellite cellular system, one or more mobile terminals communicate with a plurality of cells that are served by base stations. A typical cellular system may include hundreds of cells, and may serve thousands of mobile terminals. The cells generally serve as nodes in the system from which links are established between mobile terminals and a Mobile Telephone Switching Office (MTSO) by way of the base stations serving the cells. Each cell may have allocated to it one or more dedicated control channels and one or more traffic channels. A control channel is a dedicated channel used for transmitting cell identification and paging information. The traffic channels carry the voice and/or data information. Through the cellular network, a duplexed radio communication link may be effected between two mobile terminals or between a mobile terminal and a land line terminal, through a Public Switched Telephone Network (PSTN).

Several types of access techniques are conventionally used to provide wireless services to users of cellular systems. Traditional analog cellular systems generally employ a system referred to as Frequency Division Multiple Access (FDMA), to create communications channels, wherein discrete frequency bands serve as channels over which mobile terminals communicate with base stations. Typically, these bands are reused in geographically separated cells in order to increase system capacity.

Modern digital cellular systems typically utilize different multiple access techniques, such as Time Division Multiple Access (TDMA) and/or Code Division Multiple Access (CDMA), to provide increased spectral efficiency. In TDMA systems, such as those conforming to the GSM or IS-136 Standards, carriers are divided into sequential time slots that are assigned to multiple channels, such that a plurality of channels may be multiplexed on a single carrier. CDMA systems, such as those conforming to the IS-95 Standard, achieve increased channel capacity by using "spread spectrum" techniques, wherein a channel is defined by modulating a data-modulated carrier signal by a unique spreading code, i.e., a code that spreads an original data-modulated carrier over a wide portion of the frequency spectrum in which the communications system operates.

Conventional spread spectrum CDMA communications systems commonly use so-called "Direct Sequence" (DS) spread spectrum modulation. In DS modulation, a data-modulated carrier is directly modulated by a spreading code or sequence before being amplified by a power amplifier and transmitted. However, other forms of spread spectrum modulation may be used.

When a mobile terminal in a cellular system is turned on, it generally searches for possible base stations with which to synchronize. In cellular systems, there are a number of possible radio channels or frequencies the base stations can use, and the mobile terminal may have to scan them all in order to find the best base station to use, in terms of signal strength and/or capacity. For example, in Wideband CDMA (WCDMA), there are about 300 possible radio channels separated by about 200 kHz, at about 1.9 GHz (uplink) and about 2.1 GHz (downlink).

Further, in WCDMA, some control channels transmitted from the base stations, called Primary Synchronization CHannel (P-SCH), Secondary Synchronization CHannel (S-SCH), and Common PIlot CHannel (CPICH), are used by the mobile terminal to find and detect a cell. In general, the initial cell search procedure may work as follows:

1. P-SCH is used in order to detect a new cell.
2. If a new cell is detected, S-SCH is used to find the timing and scrambling code for the new cell.
3. When the timing for the new cell is found, CPICH is used to measure the signal strength.

For more information about basic techniques for making cell search in WCDMA, see, for example, Wang et al., *Cell Search in WCDMA*, IEEE Journal on Selected Areas in Communications, Vol. 18, No. 8, 2000, pp. 1470–1482, the disclosure of which is incorporated by reference herein in its entirety as if set forth fully herein.

In principle, the mobile terminal may need to perform the cell search on each radio channel in order to be certain all base stations have been found. From these base stations, the best base station to use may be found.

When performing the initial cell search in systems such as WCDMA, it may take a long time to synchronize with the base station. In particular, it may take a long time to scan and perform a cell search on all radio channels, since the P-SCH and S-SCH channels generally are weak and detection statistics generally are quite low. Therefore, it may be desirable to shorten this search time.

Systems and methods for accelerated scanning of cellular channels are described in U.S. Pat. No. 6,205,334 B1 to Dent, entitled *Accelerated Scanning of Cellular Channels by Cellular Radiotelephones*. As described in the Abstract thereof, multiple-mode cellular radiotelephones use a wide bandwidth receiving mode while scanning for signals in a narrow bandwidth receiving mode. Thus, when it is desired to scan the received frequency band to search for the presence of narrowband signals, the wider receiver bandwidth is first selected. When significant signal energy is identified in the wider bandwidth, a further scan using the narrowband mode may then be provided in order to locate the narrow bandwidth channel containing the strongest signal. In another embodiment, the signals that are received in the wider bandwidth mode are digitized to obtain complex signal samples. The complex signal samples are then processed to determine energy in each of a plurality of narrower bandwidths corresponding to channels in the narrower bandwidth cellular radiotelephone standards. Accelerated scanning of TDMA cellular channels may be obtained by tuning the cellular radiotelephone to a succession of frequency channels within one TDMA time slot and measuring signal strength for each of the succession of frequency channels. Tuning and measuring is then repeated for remaining ones of the TDMA time slots in the TDMA frame, preferably using the same channels in the same order. For each frequency channel, the signal strength that is the greatest measured signal strength of the frequency channel in all of the TDMA slots is assigned to that frequency channel. The assigned signal strengths may then be used to select a frequency channel for TDMA signal acquisition. Historical information may also be used to accelerate scanning of cellular channels by a cellular radiotelephone.

SUMMARY OF THE INVENTION

In some embodiments of the present invention, a mobile terminal can identify a plurality of cellular control channels that can be received by the mobile terminal from a cellular system, by identifying a cellular control channel that can be received from a history list of cellular control channels that were previously received by the mobile terminal, and by scanning for a next cellular control channel that can be received by the mobile terminal by skipping at least one cellular control channel that is adjacent the cellular control channel that was identified, based on channel allocation rules in the cellular system. Accordingly, some embodiments of the present invention can use historical information and/or a priori knowledge of the cellular system characteristics, such as the channel allocation rules. When finding a base station on a certain carrier frequency, for example $f_0$, the a priori knowledge of the cellular system signals also may be used to exclude carrier frequencies in a neighborhood of $f_0$ that generally cannot be used in neighboring cells. The initial search time thereby can be reduced.

In other embodiments of the present invention, the cellular control channels have a bandwidth and scanning is performed for a next cellular control channel that can be received by the mobile terminal, by refraining from scanning at least one cellular control channel that is within the bandwidth of the cellular control channel that was identified. In still other embodiments of the present invention, scanning is performed by scanning for a most probable next cellular control channel that can be received by the mobile terminal by skipping at least one cellular control channel that is adjacent the cellular control channel that was identified, based on the channel allocation rules in the cellular system. In yet other embodiments, after scanning for a most probable next control channel, scanning is performed for a second most probable next control channel that can be received by the mobile terminal by skipping at least one cellular control channel that is adjacent the cellular control channel that was identified, based on the channel allocation rules in the cellular system, upon failure to detect a most probable next control channel.

In still other embodiments of the present invention, prior to identifying a cellular control channel that can be received by the mobile terminal from the history list, an attempt is made to detect energy in at least a portion of the cellular system band. In response to detecting energy in at least a portion of the cellular system band, an identification of a cellular control channel that can be received by the mobile terminal from the history list is performed. Accordingly, in some embodiments, a portion of, or the entire, cellular system band is scanned, and the Received Signal Strength Indication (RSSI) and/or other indication of radio frequency energy is measured and used to determine whether there are any signals in the frequency band at all, or not. In other embodiments, a scan may be performed of at least some of the cellular control channels in the history list in order to detect energy therein, and a cellular control channel from the history list for which energy was detected is then identified. In still other embodiments, a scan may be performed over a portion of, or the entire, cellular system band, to provide candidates of possible carrier frequencies. Then, control channels are attempted to be detected on at least some of these candidates using the history list and/or channel allocation rules.

It will be understood by those having skill in the art that other embodiments of the present invention can employ combinations and subcombinations of the history list, skipping at least one cellular control channel, and/or energy detection, to allow the synchronization time of the initial frequency scan and cell search in a mobile terminal, such as a WCDMA mobile terminal, to be reduced. Other embodiments of the present invention use a controller of a mobile terminal to control a wireless receiver of a mobile terminal. The controller performs the identification of a cellular channel from a history list, performs the scanning for a next cellular channel by skipping at least one cellular control channel that is adjacent the cellular control channel that was identified, and/or performs the attempting to detect energy in at least a portion of the cellular system band. Fast initial frequency scans and cell searching thereby may be provided.

DETAILED DESCRIPTION OF PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or flowchart illustrations of methods and mobile terminals according to embodiments of the invention. It is understood that each block of the block diagrams and/or flowchart illustrations, and combinations of blocks in the block diagrams and/or flowchart illustrations, can be implemented by radio frequency, analog and/or digital hardware, and/or computer program instructions. These computer program instructions may be provided to a processor of a general purpose computer, special purpose computer, and/or other programmable data processing apparatus in a mobile terminal, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a mobile terminal to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
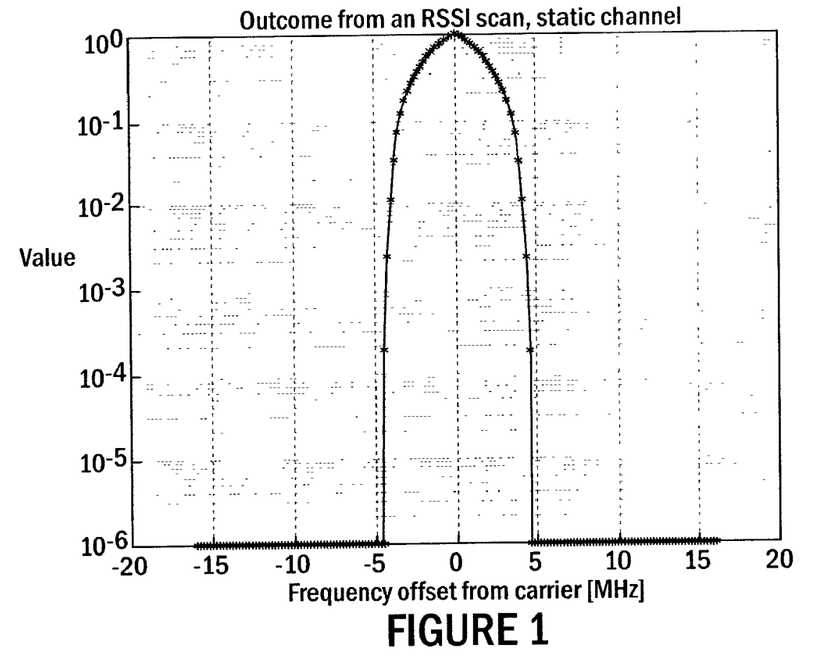
FIGS. 1 and 2 graphically illustrate energy around a carrier frequency in a WCDMA system.
Figure 2:
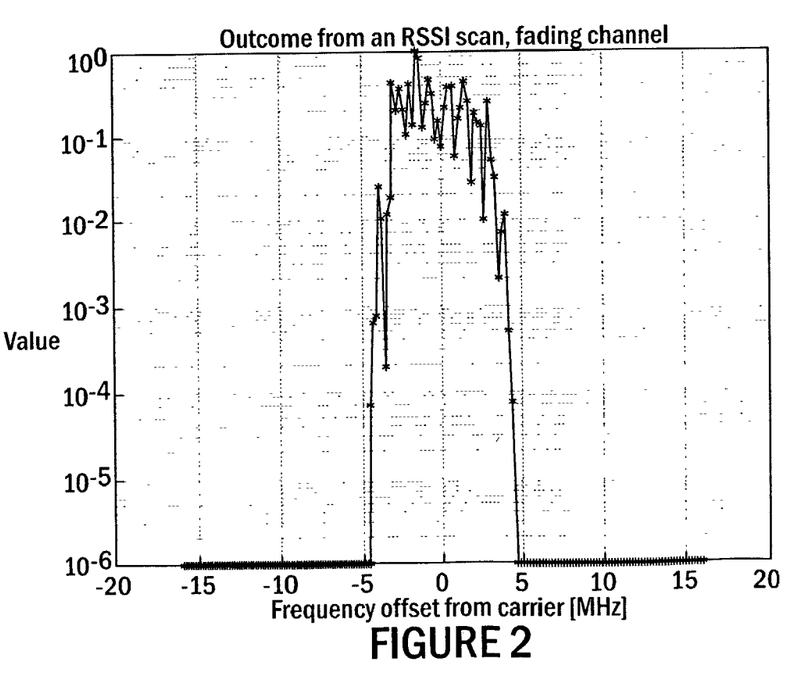

Some embodiments of the present invention may arise from a realization that instead of searching for P-SCH and S-SCH on the entire frequency band from the beginning to the end, one can use a different kind of a priori knowledge. For example, in some embodiments, an energy scan (for example, RSSI) can be made over a portion of, or the entire, band. Thus, the mobile terminal can see if there is any signal energy somewhere in the band, indicating there is a base station transmitting information. An RSSI scan can be very fast since only energy detection is performed, rather than signal decoding. The WCDMA signal is about 5 MHz wide, so that when performing a frequency scan over about a 200 kHz band using a WCDMA receiver with about 5 MHz bandwidth, one may (ideally) find an "energy bubble" around $f_0$ if there is any base station transmitting information at carrier frequency $f_0$. See FIG. 1. However, since the radio channel is fading, a corrupted energy bubble may be found, meaning RSSI may not be used to detect the center frequency. See FIG. 2. Nevertheless, as can be seen in FIG. 2, RSSI can be used to determine if there is energy that is being received at the mobile terminal.

If RSSI indicates that there is some energy, a smart frequency scan is started in some embodiments of the invention. The scan can start performing a cell search on frequencies in a history list stored in the mobile terminal, of carrier frequencies the mobile terminal used last time it was active. Then, in some embodiments, the search continues on the "most probable" carrier frequencies, where "most probable" is based on characteristics of the WCDMA signal and cell planning rules, collectively referred to herein as channel allocation rules. For example, if any base station has been found, say at $f_0$, all carrier frequencies in a neighborhood of $f_0$ can be excluded, due to the approximately 5 MHz bandwidth of the WCDMA signal. If two adjacent WCDMA channels are too close in frequency, say only separated by about 1–3 MHz, they generally will interfere with each other severely. Therefore, when planning the WCDMA system, base stations using different frequency bands and lying close to each other generally are separated by about 5 MHz in order not to interfere with each other. Hence, by searching on the most probable frequencies and excluding "not possible" carrier frequencies when detecting a base station, the initial cell search time can be reduced significantly.

Figure 3:
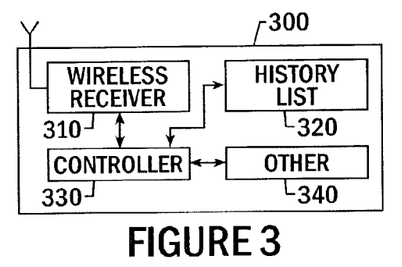
FIG. 3 is a block diagram of mobile terminals according to some embodiments of the present invention.

FIG. 3 is a block diagram of mobile terminals according to some embodiments of the present invention. As shown in FIG. 3, some embodiments of these mobile terminals 300 include a wireless receiver 310, a history list 320 of cellular control channels that previously were received by the mobile terminal 300, a controller 330 and other components 340. In some embodiments, the controller is responsive to the history list 320, and is configured to control the wireless receiver 310, to identify a cellular control channel that can be received by the mobile terminal 300 from the history list 320, and to scan for a next cellular control channel that can be received by the mobile terminal 300 by skipping at least one cellular control channel that is adjacent the cellular control channel that was identified, based on the channel allocation rules in the cellular system.

In still other embodiments, the controller 330 is further configured to control the wireless receiver, to scan for a next cellular control channel that can be received by the mobile terminal by refraining from scanning at least one cellular control channel that is within the bandwidth of the cellular control channel that was identified. In yet other embodiments, the controller is further configured to control the wireless receiver 310, to attempt to detect energy, such as RSSI, in at least a portion of the cellular system band, and to control the wireless receiver 310, to identify a cellular control channel that can be received by the mobile terminal 300 from the history list 320, in response to detecting energy in at least a portion of the cellular system band.

In still other embodiments, the controller 330 is further configured to control the wireless receiver 310 to scan a most probable next cellular control channel and/or a second most probable next cellular control channel, as will be described in detail below. In yet other embodiments, the controller 330 is configured to control the wireless receiver 310, to identify a cellular control channel that can be received by the mobile terminal 300, by skipping at least one cellular control channel that is adjacent the cellular control channel that was identified, based on the channel allocation rules for the cellular system, without using the history list 320.

It will be understood that the history list 320 may be embodied using conventional techniques, and may include a list of control channels that were used the last time the mobile terminal was activated. In other embodiments, the history list 320 may contain a list of control channels that were used in a next to last activation and/or additional prior activations of the mobile terminal 300. In still other embodiments, other criteria may be used to indicate preferred channels in the history list 320.

It also will be understood that the controller 330 may be embodied as systems (apparatus), methods and/or computer program products, and may take the form of an entirely hardware embodiment, an entirely software embodiment, or an embodiment combining software and hardware aspects. The controller 330 also may include one or more digital signal processors. The wireless receiver 310 may be part of a transceiver (transmitter/receiver). The other components 340 may include a GPS receiver, a pager, a facsimile device, an email sender and receiver, a World Wide Web browser and/or a user interface including a display, an input system, a touch screen, a pointing device, keys, a microphone and/or a speaker.

It also will be understood that the functionality of elements 310, 320, 330 and 340 may be combined into one or more components, and that these elements may be included in a single housing or in a plurality of housings.

Figure 4:
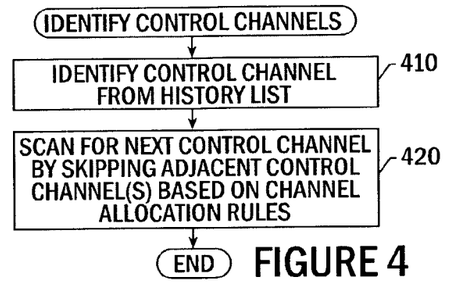
FIGS. 4–9 are flowcharts of operations for identifying in a mobile terminal a plurality of cellular control channels that can be received by the mobile terminal from a cellular system, according to various embodiments of the present invention.

FIG. 4 is a flowchart of operations for identifying in a mobile terminal a plurality of cellular control channels that can be received by the mobile terminal from a cellular system, according to some embodiments of the present invention. It will be understood that these operations may be performed in a mobile terminal, such as the mobile terminal 300 of FIG. 3. Referring now to FIG. 4, at Block 410, a cellular control channel that can be received by the mobile terminal is identified from a history list, such as history list 320, of cellular control channels that were previously received by the mobile terminal. In some embodiments, the identifying of Block 410 is preceded by obtaining the history list of cellular control channels that previously were received by the mobile terminal. In some embodiments, the identifying comprises attempting to decode the cellular control channel from the history list of cellular control channels that previously were received by the mobile terminal.

Then, referring to Block 420, scanning is performed for a next cellular control channel that can be received by the mobile terminal by skipping at least one cellular control channel that is adjacent the cellular control channel that was identified, based on channel allocation rules in the cellular system. It will be understood that operations of Blocks 410 and 420 may be performed sequentially and repeatedly, to identify a plurality of cellular control channels that can be received by the mobile terminal. A cellular control channel to be used then may be selected from the plurality of cellular control channels that were identified, using conventional techniques. In some embodiments, the scanning of Block 420 is performed by scanning for a next cellular control channel that can be received by the mobile terminal by refraining from scanning at least one cellular control channel that is within the bandwidth of the cellular control channel that was identified.

Figure 5:
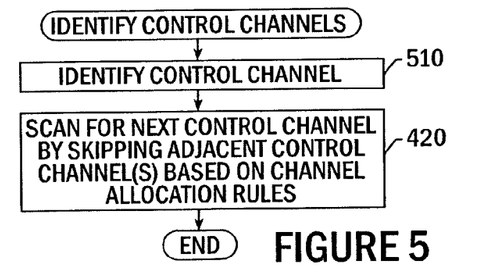

FIG. 5 illustrates operations that may be performed to identify a plurality of cellular control channels that can be received by a mobile terminal, such as the mobile terminal 300 of FIG. 3, according to other embodiments of the present invention. As shown in FIG. 5, at Block 510, a control channel that can be received by the mobile terminal is identified. In contrast with Block 410, Block 510 does not use the history list, but rather can use a sequential energy scan or other conventional priority technique to identify a cellular control channel that can be received by the mobile terminal. At Block 420, a scan is made for the next control channel, as was already described.

Figure 6:
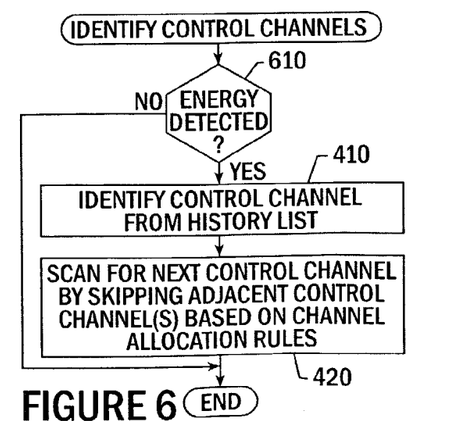

FIG. 6 is a flowchart of operations that may be used to identify a plurality of cellular control channels that can be received by a mobile terminal, such as the mobile terminal 300 of FIG. 3, according to yet other embodiments of the present invention. In FIG. 6, at Block 610, prior to identifying a control channel, an attempt is made to detect energy in at least a portion of the cellular system band at Block 610. If energy is detected at Block 610, then operations of Blocks 410 and 420 are performed. It will be understood that at Block 610, a test may be made as to whether energy is present in individual channels of the cellular system band, or a test may be made to detect whether there is energy in the cellular system band at all.

Figure 7:
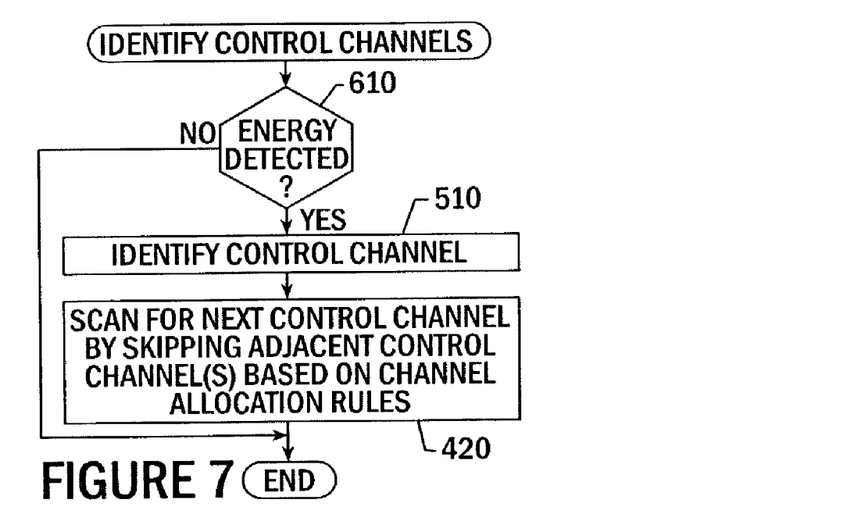

FIG. 7 is a block diagram of other operations that may be performed to identify a plurality of cellular control channels according other embodiments of the present invention. In FIG. 7, energy is detected at Block 610, and if energy is detected, then operations of Blocks 510 and 420 are performed.

Figure 8:
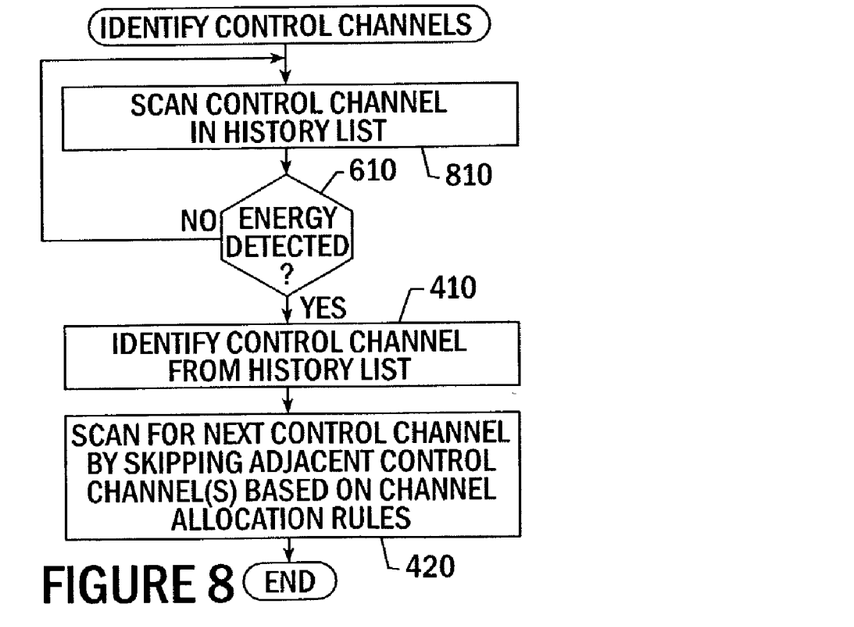

FIG. 8 is a flowchart of operations that may be used to identify a plurality of cellular control channels that can be received by a mobile terminal, such as the mobile terminal 300 of FIG. 3, according to yet other embodiments of the present invention. In FIG. 8, at Block 810, at least some of the cellular control channels in the history list are scanned, and a test is performed at Block 610 in order to detect energy therein. If energy is detected in the scan of a control channel from the history list at Block 610, then operations of Blocks 410 and 420 are performed on those control channels for which energy was detected. It also will be understood that in other embodiments of FIG. 8, the cellular control channel that is scanned to detect energy need not be contained in the history list. Rather, other conventional techniques, such as a sequential scan, may be used to detect energy. Thus, in embodiments of FIG. 8, energy is first detected before attempting to decode the channel.

Figure 9:
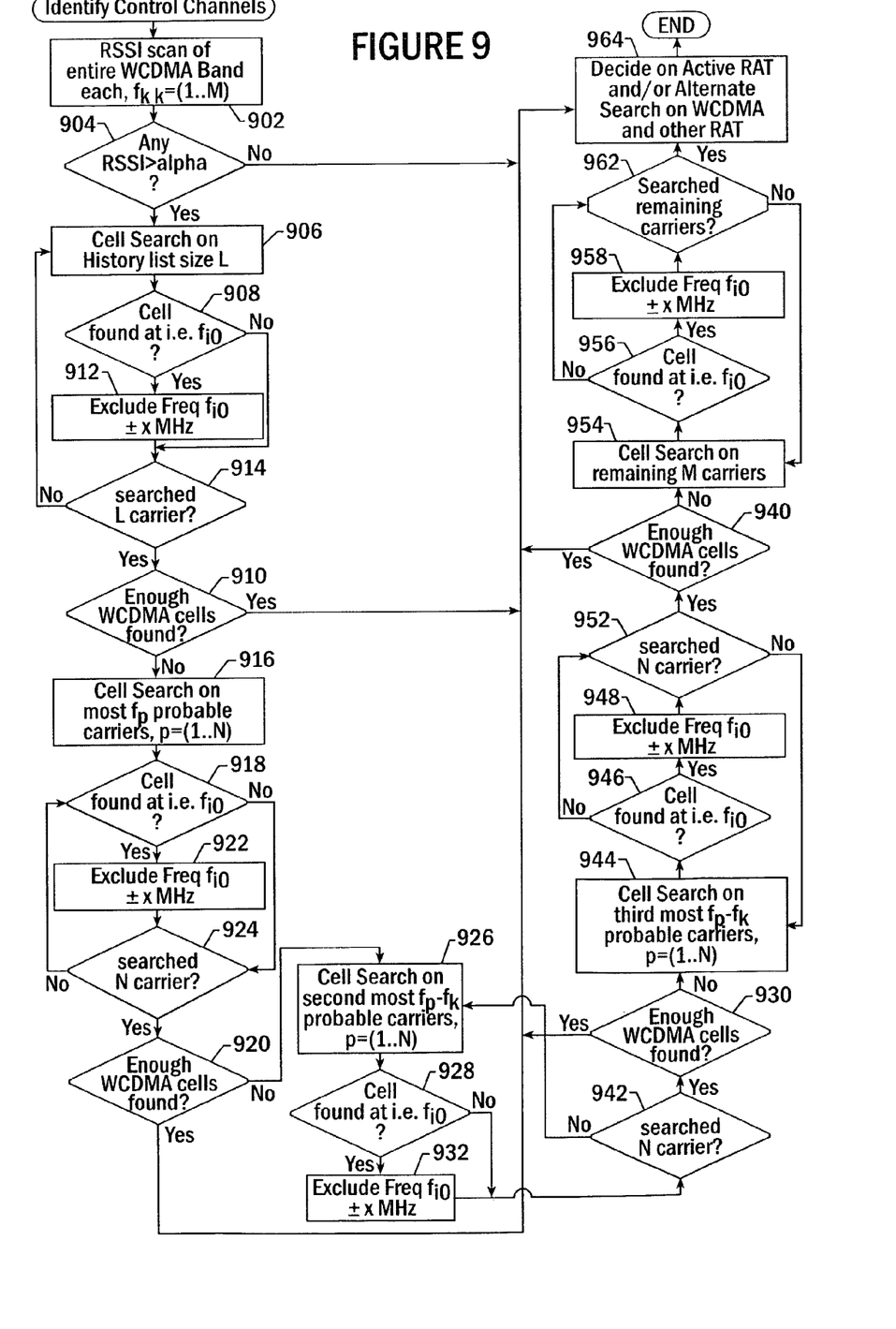

FIG. 9 is a flowchart of operations that may be used to identify a plurality of cellular control channels that can be received by a mobile terminal, such as the mobile terminal 300 of FIG. 3, according to still other embodiments of the present invention. Embodiments of FIG. 9 will be described based on WCDMA and the carrier frequencies (here called UTRA Absolute Radio Frequency Channel Number (UARFCN)) based on definitions in the well-known 3GPP WCDMA standard. It will be understood, however, that embodiments of the invention may be used with other air interfaces and/or standards.

Referring now to FIG. 9, the WCDMA band is split into 5 MHz increments. Let 2110 MHz (UARFCN0=10550) be $f_0$, 2115 MHz (UARFCN1=10575) be $f_1$, etc. At Block 902, an RSSI scan is performed over the entire WCDMA band (all UARFCN), i.e., $f_k$ where k=(1 . . . , M). If there are frequencies with RSSI over −95 dBm (in general, above a certain threshold, $\alpha$), at Block 904, then there are indications that there are base stations transmitting information. Therefore, a cell search is performed on carrier frequencies as described below.

At Block 906, the cell search is started on the L frequencies stored in the mobile terminal's history list. The cell search can, for example, be based on the above-cited Wang et al. publication, but embodiments of the invention are not limited to that cell search scheme.

At Block 908, for each frequency in which a cell is found, say $f_{t_o}$, then at Block 912, exclude all frequencies in the range $f_{t_o} \pm 3$ MHz (in the general case, x MHz, where x is based on characteristics such as bandwidth of the received signal), i.e., $UARFCN_{f_{t_o}} \pm 15$. On these UARFCN, there generally are not any carrier frequencies ("forbidden areas") due to the channel allocation rules in the cellular system. If there are no UARFCN left to search over in the frequency band at Block 914 (i.e., all L frequencies have been searched), the search ends. Moreover, if enough WCDMA cells have been found at Block 910, then operations proceed to Block 964, as described below. Otherwise, continue searching UARFCN$_i$+12, UARFCN$_i$+13 at Block 916 (corresponding to f$_i$+2.4 MHz and f$_i$+2.6 MHz, respectively), for i=0, ..., 11, i.e., the most f$_p$ probable frequencies, where p=(1 ..., N) (these are the "most probable" carrier frequencies), if these frequencies are not in forbidden areas.

For each frequency in which a cell is found at Block 918, say at f$_{l_o}$, exclude all frequencies in the range f$_{l_o}$±3 MHz, i.e. UARFCN$_{l_o}$+15 at Block 922. On these UARFCN, there generally are not any carrier frequencies ("forbidden areas") due to the channel allocation rules of the cellular system. If there are no UARFCN left to search over, i.e., all N frequencies have been searched (Block 924), the search ends. Moreover, if enough WCDMA cells have been found at Block 920, then operations proceed to Block 964, as described below. Otherwise, search on UARFCN$_i$+11, UARFCN$_i$+14 at Block 926 (corresponding to f$_i$+2.2 MHz and f$_i$+2.8 MHz, respectively), for i=0, ..., 11 (these are the "second most probable" carrier frequencies), if these frequencies are not in forbidden areas. For each frequency in which a cell is found (Block 928), say at f$_{l_o}$±3 MHz, i.e., UARFCN$_{l_o}$+15, there generally are not any carrier frequencies ("forbidden areas") (Block 932) due to the channel allocation rules of the cellular system. If there are no UARFCN left to search over (Block 942), the search ends. Moreover, if enough WCDMA cells have been found at Block 930, then operations proceed to Block 964, as described below. Otherwise, search on UARFCN$_i$+10, UARFCN$_i$+15 (Block 944) (corresponding to f$_i$+2.0 MHz and f$_i$+3.0 MHZ, respectively), for i=0, ..., 11 (these are the "third most probable" carrier frequencies), if these frequencies are not in forbidden areas.

For each frequency in which a cell is found (Block 946), say at f$_{l_o}$, exclude all frequencies in the range f$_{l_o}$±3 MHz, i.e., UARFCN$_{l_o}$±15 (Block 948). On these UARFCN, there generally are not any carrier frequencies ("forbidden areas") due to the channel allocation rules of the cellular system. If there are no UARFCN left to search over (Block 952), stop the search. Moreover, if enough WCDMA cells have been found at Block 940, then operations proceed to Block 964, as described below. Otherwise, search on the remaining UARFCN in the band starting at the beginning at Block 954, if these frequencies are not in forbidden areas. For each frequency in which a cell is found (Block 956), say at f$_{l_o}$±3 MHz, i.e., UARFCN$_{l_o}$±15, there generally are not any carrier frequencies ("forbidden areas") (Block 958) due to the channel allocation rules of the cellular system. If there are no UARFCN left to search over (Block 962), the search ends at Block 964, as described below; otherwise go to Block 954.

Note that the operations in the above embodiments are not limited to the above-mentioned sequence, so that other search orders are also possible. For example, as was already described, the RSSI scan (Block 902) can be performed after the history list search (Block 906).

Embodiments of the invention can also include different and/or additional stop criteria. For example, some embodiments can be stopped based on some timeout criteria, i.e., the search has been too long on the WCDMA band and the frequency scan is switched over to the GSM system or another Radio Access Technology (RAT) in Block 964. Operations then can end.

Figure 10:
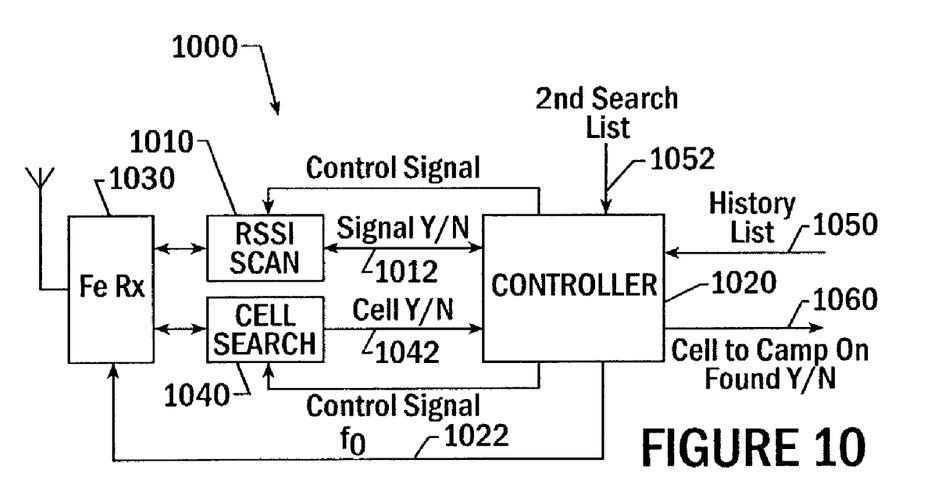
FIG. 10 is a functional block diagram of mobile terminals according to some embodiments of the present invention.

FIG. 10 is a functional block diagram of mobile terminals capable of performing an initial frequency scan and cell search according to other embodiments of the invention. As shown in FIG. 10, the mobile terminal 1000 is turned on and an RSSI scan 1010 is initiated in order to scan the entire band. A controller 1020 controls the RSSI scan 1010 and also the carrier frequencies 1022 to scan on, by controlling the front-end receiver (Fe Rx) 1030. If a signal 1012 is detected by the RSSI scan 1010, the controller 1020 obtains the history list 1050 that is stored in memory, and starts performing a cell search 1040 on the carrier frequencies stored in the list. If any cells are detected at 1042, they are stored in the controller 1020 and forbidden "carrier frequencies" are excluded in the further search. After the history list 1050 has been searched, the search continues on a second search list 1052, this list based on WCDMA signal characteristics and cell planning rules according to the embodiments described above. When the entire frequency band has been scanned and a plurality of cellular control channels have been identified, the best cell to camp on 1060 (if any) is sent to higher layer and relayed back to the cellular network. An idle mode connection is then started using conventional rules of the cellular system.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for identifying in a mobile terminal a plurality of cellular control channels that can be received by the mobile terminal from a cellular system, the method comprising:
   identifying a cellular control channel that can be received by the mobile terminal from a history list of cellular control channels that were previously received by the mobile terminal; and
   scanning for a next cellular control channel that can be received by the mobile terminal by skipping at least one cellular control channel that is adjacent the cellular control channel that was identified, based on channel allocation rules in the cellular system.

2. A method according to claim 1 wherein the cellular control channels have a bandwidth and wherein the scanning comprises scanning for a next cellular control channel that can be received by the mobile terminal by refraining from scanning at least one cellular control channel that is within the bandwidth of the cellular control channel that was identified.

3. A method according to claim 1:
   wherein the cellular system communicates over a cellular system band;
   wherein the identifying is preceded by attempting to detect energy in at least a portion of the cellular system band; and
   wherein the identifying is performed in response to detecting energy in at least a portion of the cellular system band.

4. A method according to claim 1 wherein the identifying is preceded by:
   obtaining the history list of cellular control channels that were previously received by the mobile terminal.

5. A method according to claim 1 wherein the identifying comprises:
   attempting to decode a cellular control channel from the history list of cellular control channels that were previously received by the mobile terminal.

6. A method according to claim 5 wherein the scanning comprises:
attempting to decode the next cellular control channel.

7. A method according to claim 1 wherein the scanning comprises:
scanning for a most probable next cellular control channel that can be received by the mobile terminal by skipping at least one cellular control channel that is adjacent the cellular control channel that was identified, based on the channel allocation rules in the cellular system.

8. A method according to claim 7 wherein the scanning for a most probable next cellular control channel is followed by:
scanning for a second most probable next cellular control channel that can be received by the mobile terminal by skipping at least one cellular control channel that is adjacent the cellular control channel that was identified, based on the channel allocation rules in the cellular system, upon failure to detect a most probable next cellular control channel.

9. A method according to claim 1 wherein the identifying comprises:
scanning at least some of the cellular control channels in the history list of cellular control channels that were previously received by the mobile terminal to detect energy therein; and
identifying a cellular control channel from the history list of cellular control channels that were previously received by the mobile terminal and for which energy was detected.

10. A method according to claim 1 wherein the cellular system is a CDMA system in which cellular control channels are spaced apart by about 200 kHz and have a bandwidth of about 5 MHz.

11. A method for identifying in a mobile terminal a plurality of cellular control channels that can be received by the mobile terminal from a cellular system, the method comprising:
identifying a cellular control channel that can be received by the mobile terminal; and
scanning for a next cellular control channel that can be received by the mobile terminal by skipping at least one cellular control channel that is adjacent the cellular control channel that was identified, based on channel allocation rules in the cellular system.

12. A method according to claim 11 wherein the cellular control channels have a bandwidth and wherein the scanning comprises scanning for a next cellular control channel that can be received by the mobile terminal by refraining from scanning at least one cellular control channel that is within the bandwidth of the cellular control channel that was identified.

13. A method according to claim 11 wherein the scanning comprises:
attempting to decode the next cellular control channel.

14. A method according to claim 11 wherein the scanning comprises:
scanning for a most probable next cellular control channel that can be received by the mobile terminal by skipping at least one cellular control channel that is adjacent the cellular control channel that was identified, based on the channel allocation rules in the cellular system.

15. A method according to claim 14 wherein the scanning for a most probable next cellular control channel is followed by:
scanning for a second most probable next cellular control channel that can be received by the mobile terminal by skipping at least one cellular control channel that is adjacent the cellular control channel that was identified, based on the channel allocation rules in the cellular system, upon failure to detect a most probable next cellular control channel.

16. A mobile terminal comprising:
a wireless receiver;
a history list of cellular control channels that were previously received by the mobile terminal; and
a controller that is responsive to the history list of cellular control channels that were previously received by the mobile terminal and that is configured to control the wireless receiver to identify a cellular control channel that can be received by the mobile terminal from the history list and to scan for a next cellular control channel that can be received by the mobile terminal by skipping at least one cellular control channel that is adjacent the cellular control channel that was identified, based on channel allocation rules in a cellular system in which the mobile terminal operates.

17. A mobile terminal according to claim 16 wherein the cellular control channels have a bandwidth and wherein the controller is further configured to control the wireless receiver to scan for a next cellular control channel that can be received by the mobile terminal by refraining from scanning at least one cellular control channel that is within the bandwidth of the cellular control channel that was identified.

18. A mobile terminal according to claim 16:
wherein the cellular system communicates over a cellular system band; and
wherein the controller is further configured to control the wireless receiver to attempt to detect energy in at least a portion of the cellular system band and to control the wireless receiver to identify a cellular control channel that can be received by the mobile terminal from the history list in response to detecting energy in at least a portion of the cellular system band.

19. A mobile terminal according to claim 16 wherein the controller is further configured to control the wireless receiver to scan for a most probable next cellular control channel that can be received by the mobile terminal by skipping at least one cellular control channel that is adjacent the cellular control channel that was identified, based on the channel allocation rules in the cellular system.

20. A mobile terminal according to claim 19 wherein the controller is further configured to control the wireless receiver to scan for a second most probable next cellular control channel that can be received by the mobile terminal by skipping at least one cellular control channel that is adjacent the cellular control channel that was identified, based on the channel allocation rules in the cellular system, upon failure to detect a most probable next cellular control channel.

21. A mobile terminal according to claim 16 wherein the controller is further configured to control the wireless receiver to identify a cellular control channel that can be received by the mobile terminal from the history list by controlling the wireless receiver to scan at least some of the cellular control channels in the history list of cellular control channels that were previously received by the mobile terminal to detect energy therein and to identify a cellular control channel from the history list of cellular control channels that were previously received by the mobile terminal and for which energy was detected.

22. A mobile terminal according to claim 16 wherein the cellular system is a CDMA system in which cellular control channels are spaced apart by about 200 kHz and have a bandwidth of about 5 MHz.

23. A mobile terminal comprising:
a wireless receiver; and
a controller that is configured to control the wireless receiver to identify a cellular control channel that can be received by the mobile terminal and to scan for a next cellular control channel that can be received by the mobile terminal by skipping at least one cellular control channel that is adjacent the cellular control channel that was identified, based on channel allocation rules in a cellular system in which the mobile terminal operates.

24. A mobile terminal according to claim 23 wherein the cellular control channels have a bandwidth and wherein the controller is further configured to control the wireless receiver to scan for a next cellular control channel that can be received by the mobile terminal by refraining from scanning at least one cellular control channel that is within the bandwidth of the cellular control channel that was identified.

25. A mobile terminal according to claim 23:
wherein the cellular system communicates over a cellular system band; and
wherein the controller is further configured to control the wireless receiver to attempt to detect energy in at least a portion of the cellular system band and to control the wireless receiver to identify a cellular control channel that can be received by the mobile terminal in response to detecting energy in at least a portion of the cellular system band.

26. A mobile terminal according to claim 23 wherein the controller is further configured to control the wireless receiver to scan for a most probable next cellular control channel that can be received by the mobile terminal by skipping at least one cellular control channel that is adjacent the cellular control channel that was identified, based on the channel allocation rules in the cellular system.

27. A mobile terminal according to claim 26 wherein the controller is further configured to control the wireless receiver to scan for a second most probable next cellular control channel that can be received by the mobile terminal by skipping at least one cellular control channel that is adjacent the cellular control channel that was identified, based on the channel allocation rules in the cellular system, upon failure to detect a most probable next cellular control channel.

28. A mobile terminal comprising:
means for wirelessly receiving cellular control channels of a cellular system; and
a history list of cellular control channels that were previously received by the mobile terminal; and
means for controlling the means for wirelessly receiving to identify a cellular control channel that can be received by the mobile terminal from the history list and to scan for a next cellular control channel that can be received by the mobile terminal by skipping at least one cellular control channel that is adjacent the cellular control channel that was identified, based on channel allocation rules in the cellular system.

29. A mobile terminal comprising:
means for wirelessly receiving cellular control channels of a cellular system; and
means for controlling the means for wirelessly receiving to identify a cellular control channel that can be received by the mobile terminal and to scan for a next cellular control channel that can be received by the mobile terminal by skipping at least one cellular control channel that is adjacent the cellular control channel that was identified, based on channel allocation rules in the cellular system.

* * * * *